United States Patent
Reineccius et al.

(10) Patent No.: US 9,912,160 B2
(45) Date of Patent: Mar. 6, 2018

(54) METHOD FOR SAFE ISOLATION AND RECONNECT OF GRID GENERATION DEVICES TO ENERGY STORAGE OR ALTERNATE GENERATION REFERENCE

(71) Applicant: POWERTREE SERVICES, INC., San Francisco, CA (US)

(72) Inventors: Stacey Reineccius, San Francisco, CA (US); John C. Sellers, El Cerrito, CA (US)

(73) Assignee: Powertree Services, Inc., San Francisco, CA (US)

( * ) Notice: Subject to any disclaimer, the term of this patent is extended or adjusted under 35 U.S.C. 154(b) by 104 days.

(21) Appl. No.: 15/153,846

(22) Filed: May 13, 2016

(65) Prior Publication Data
US 2016/0344190 A1    Nov. 24, 2016

Related U.S. Application Data

(60) Provisional application No. 62/163,318, filed on May 18, 2015.

(51) Int. Cl.
*H02J 3/38* (2006.01)
*H02J 9/06* (2006.01)

(52) U.S. Cl.
CPC ............. *H02J 3/383* (2013.01); *H02J 3/386* (2013.01); *H02J 9/062* (2013.01); *Y02B 10/72* (2013.01);
(Continued)

(58) Field of Classification Search
CPC . H02J 3/383; H02J 9/062; H02J 3/386; Y02B 10/72; Y02E 10/763; Y02E 10/566; Y02E 10/563
See application file for complete search history.

(56) References Cited

U.S. PATENT DOCUMENTS 3,551,702 A    12/1970 Levine et al.
4,412,267 A    10/1983 Hansen et al.
(Continued)

FOREIGN PATENT DOCUMENTS

JP    2014180125 A    9/2014
KR    101259728 B1    5/2013

OTHER PUBLICATIONS

PCT/US2016/032286, International Search Report and Written Opinion, dated Aug. 22, 2016, 13 pages.

*Primary Examiner* — Jared Fureman
*Assistant Examiner* — Michael Warmflash
(74) *Attorney, Agent, or Firm* — Powertree Services, Inc.

(57) ABSTRACT

Power control circuitry, power systems, and related methods are disclosed. A power system includes power control circuitry including a first power switch configured to couple a supplemental grid-synchronized power generator to a main grid power source, and a second power switch configured to couple the supplemental grid-synchronized power generator to a distribution unit configured to distribute electrical power to loads. The power control circuitry also includes time delay circuitry configured to control the first power switch and the second power switch. A method includes maintaining a supplemental grid-synchronized power generator coupled to a main grid power source while main electrical power is provided thereby, and decoupling the supplemental grid-synchronized power generator therefrom responsive to a cease in the main electrical power. The method also includes coupling the supplemental grid-synchronized power generator to a distribution unit a delayed period of time following a cease in the main electrical power.

20 Claims, 7 Drawing Sheets

(52) U.S. Cl.
CPC .......... *Y02E 10/563* (2013.01); *Y02E 10/566* (2013.01); *Y02E 10/763* (2013.01)

(56) References Cited

U.S. PATENT DOCUMENTS

| | | | |
|---|---|---|---|
| 4,672,227 A | 6/1987 | Lagree et al. | |
| 5,224,011 A | 6/1993 | Yalla et al. | |
| 6,037,758 A | 3/2000 | Perez | |
| 8,766,489 B2 | 7/2014 | Lathrop et al. | |
| 8,922,059 B2 * | 12/2014 | Yoneda | H02J 3/383 136/244 |
| 2011/0254372 A1 * | 10/2011 | Haines | H02J 9/062 307/66 |
| 2012/0261992 A1 * | 10/2012 | Parker | H02J 7/35 307/64 |

\* cited by examiner

METHOD FOR SAFE ISOLATION AND RECONNECT OF GRID GENERATION DEVICES TO ENERGY STORAGE OR ALTERNATE GENERATION REFERENCE

RELATED APPLICATIONS

This application claims priority to U.S. Provisional Application 62/163,318 to Stacey Reineccius et al., filed May 18, 2015, the entire disclosure of which is hereby incorporated herein by this reference.

TECHNICAL FIELD

The disclosure relates to alternating current (AC) grid connected solar photo voltaic (PV) systems, wind generation, energy storage systems, or the like, in electric grid applications, or other applications where AC power generation devices use synchronization to an external AC voltage and frequency source.

BACKGROUND

Current alternating current (AC) solar photo voltaic (PV) and other grid connected generation or energy storage systems (e.g., wind generators, energy storage, etc.) utilize common grid procedures such as those described in Underwriter Laboratories (UL) 1741 standard, or Institute of Electrical and Electronics Engineers (IEEE) 1547.1 standard, which specify in great detail the times, methods, and conditions under which these devices may synchronize with, and deliver energy to, a reference AC source, such as the typical power grid. These devices are designed for safety, and are used widely in gigawatts' worth of electric generation systems today.

One characteristic of existing standards is that when voltage or frequency outside of a defined range is detected, the system deactivates any power provision to the AC reference it is connected to, but maintains a measurement of the AC reference to trigger a resynchronization and reconnection when the system reactivates.

Furthermore, generation systems interacting with a battery-based system typically utilize direct current (DC) based charge controllers that connect directly to the DC battery bank. Such configurations do not directly connect the solar to an inverter, but rather connect the solar to a battery bank from which the grid tied inverter then draws energy to deliver to either the grid or onsite loads.

DETAILED DESCRIPTION OF PREFERRED EMBODIMENTS

In the following detailed description, reference is made to the accompanying drawings, which form a part hereof, and in which is shown by way of illustration specific embodiments in which the present disclosure may be practiced. These embodiments are described in sufficient detail to enable those of ordinary skill in the art to practice the disclosure made herein. It should be understood, however, that the detailed description and the specific examples, while indicating examples of embodiments of the disclosure, are given by way of illustration only, and not by way of limitation. From the disclosure, various substitutions, modifications, additions, rearrangements, or combinations thereof within the scope of the disclosure may be made and will become apparent to those of ordinary skill in the art.

In accordance with common practice, the various features illustrated in the drawings may not be drawn to scale. The illustrations presented herein are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus or all operations of a particular method. Also, some of the drawings may include elements depicted with broken lines, which emphasize that such elements are optional (although lack of emphasis of optionality in other elements is not necessarily intended to indicate that the other elements are mandatory).

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It should be understood by a person of ordinary skill in the art that the signal may represent a bus of signals, wherein the bus may have a variety of bit widths and the present disclosure may be implemented on any number of data signals including a single data signal.

The various illustrative logical blocks, modules, circuits, and algorithm acts described in connection with embodiments disclosed herein may be implemented as electronic hardware, computer software, or combinations of both. To clearly illustrate this interchangeability of hardware and software, various illustrative components, blocks, modules, circuits, and acts are described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments of the disclosure described herein.

In addition, it is noted that the embodiments may be described in terms of a process that is depicted as a flowchart, a flow diagram, a structure diagram, a signaling diagram, or a block diagram. Although a flowchart or signaling diagram may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more computer-readable instructions (e.g., software code) on a computer-readable medium. Computer-readable media include both computer storage media (i.e., non-transitory media) and communication media including any medium that facilitates transfer of a computer program from one place to another.

Figure 1:
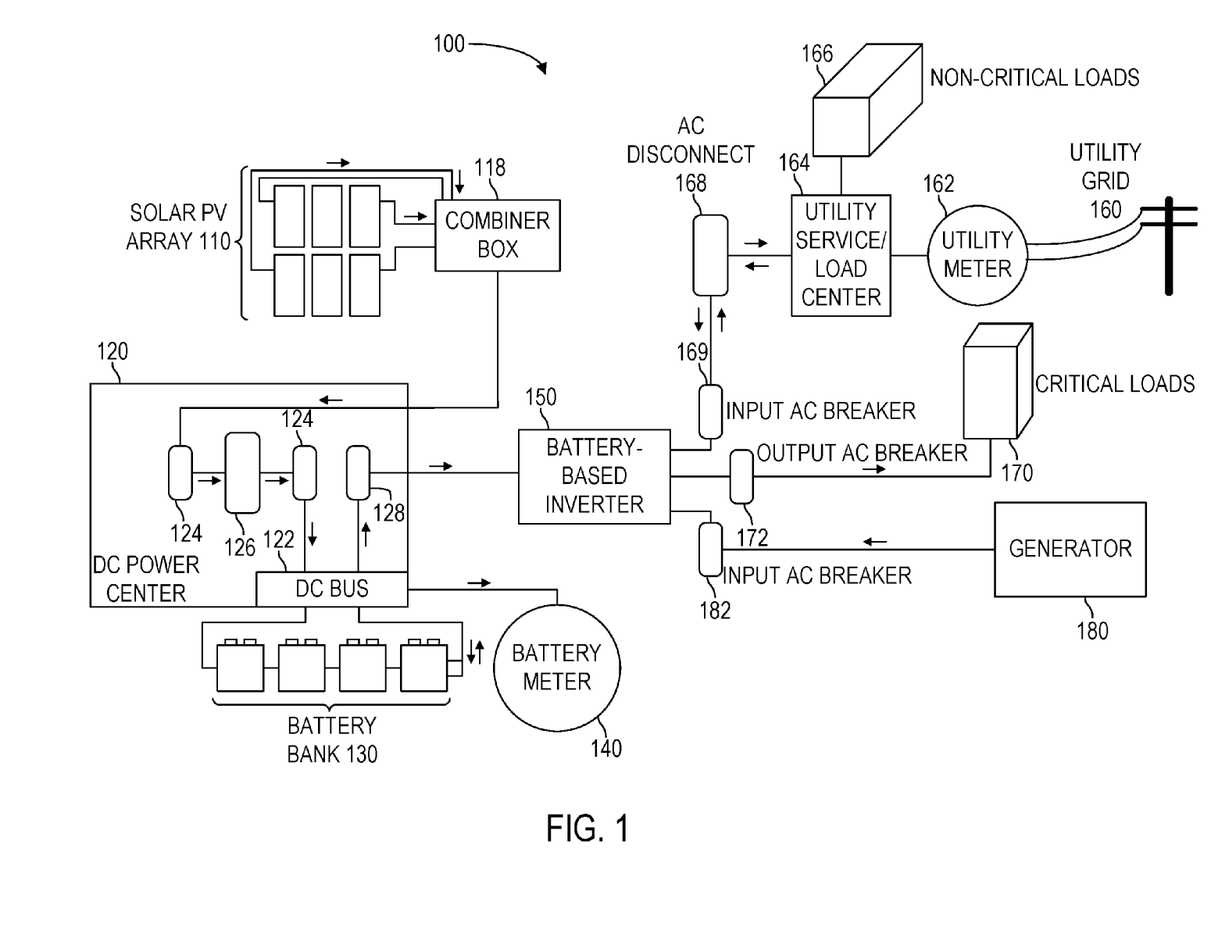
FIG. 1 is a simplified schematic diagram of a power system.

FIG. 1 is a simplified schematic diagram of a power system 100. The diagram of the power system 100 illustrates an example interconnection of a grid-tied solar with battery support via a direct current (DC) charge controller. The power system 100 includes a solar photovoltaic (PV) array 110, operably coupled to a DC power center 120 by a combiner box 118. The DC power center 120 includes a DC bus 122 operably coupled to a battery bank 130 and a battery meter 140 of the power system 100. The DC power center 120 also includes a pair of DC breakers 124, and a charge controller 126 operably coupled in between the pair of DC breakers 124. The DC breakers 124 and the charge controller 126 operably couple the DC bus 122 to the combiner box 118. The DC power center 120 further includes a DC inverter breaker 128, which is operably coupled to a battery-based inverter 150 of the power system 100.

The battery-based inverter 150 is operably coupled to a utility grid 160 of the power system 100 via an input alternating current (AC) breaker 169, an AC disconnect 168, a utility service/load center 164, and a utility meter 162. The utility service/load center 164 may be operably coupled to non-critical loads 166. The battery-based inverter 150 is also operably coupled to critical loads 170 of the power system 100 via an output AC breaker 172. The battery-based inverter 150 is further operably coupled to a generator 180 of the power system 100 via an input AC breaker 182.

The power system 100 of FIG. 1, and other similar power systems, have a number of disadvantages (e.g., restrictions), which limit their use in various environments, and for various purposes. These disadvantages may include:
- an inability to work with microinverters, which deliver AC power directly from a panel, and do not feed a DC charge controller;
- additional expense for redundant equipment for DC charge control if solar is to be collected and usable when islanded from the grid by the battery-based inverter; and
- inadequacy in mixed cases where alternative net metering (e.g., virtual net metering) or "community" solar allocation arrangements are used, or where a dedicated meter is used.

The present disclosure enables the solar PV generation to be more flexibly used and to enable useful value during power outages or cases where a location may need to be islanded.

Disclosed herein are a system and method to enable an AC grid connected energy generation or storage resource (e.g., a solar PV, wind generator, energy storage, other generator, or other storage resource) to be safely deactivated and reconnected to an alternative AC reference source to allow continued generation. The ability to disconnect and connect to (synch with) an alternative AC reference source may allow for continued generation at minimal cost during main AC grid outages, whether deliberate or caused by disaster.

In some embodiments, disclosed is power control circuitry including a main interface, a supplemental interface, a distribution interface, a first power switch, a second power switch, and time delay circuitry. The main interface is configured to receive main electrical power from a main grid power source. The supplemental interface is configured to receive supplemental electrical power from a supplemental grid-synchronized generator. The distribution interface is configured to deliver electrical power to a distribution unit configured to distribute the electrical power to one or more loads. The first power switch is configured to selectively operably couple the supplemental interface to the main interface. The second power switch is configured to selectively operably couple the supplemental interface to the distribution interface. The time delay circuitry is configured to control switching of the first power switch and the second power switch, the time delay circuitry configured to control the first power switch to: maintain the supplemental interface operably coupled to the main interface while the main grid power source is providing the main electrical power; decouple the supplemental interface from the main power interface responsive to the main grid power source ceasing to provide the main electrical power; and operably couple the supplemental interface to the main interface a delayed period of time following a transition from the main grid power source not providing the main electrical power to the main grid power source providing the main electrical power. The time delay circuitry is also configured to control the second power switch to operably couple the supplemental interface to the distribution interface another delayed period of time after the main grid power ceases to provide the main electrical power.

In some embodiments, disclosed is a method of controlling a power system. The method includes maintaining a supplemental grid-synchronized power generator operably coupled to a main grid power source while the main grid power source is providing main electrical power. The method also includes decoupling the supplemental grid-synchronized power generator from the main grid power source responsive to the main grid power source ceasing to provide the main electrical power. The method further includes operably coupling the supplemental grid-synchronized power generator to a distribution unit configured to distribute electrical power to at least one of loads and an energy storage system a delayed period of time following the main grid power source ceasing to provide the main electrical power. The method also includes operably coupling the supplemental grid-synchronized power generator to the main grid power source another delayed period of time following a transition from the main grid power source not providing the main electrical power to the main grid power source providing the main electrical power.

In some embodiments, disclosed is a power system including power control circuitry including a first power switch configured to selectively operably couple a supplemental grid-synchronized power generator to a main grid power source. The power control circuitry also includes a second power switch configured to selectively operably couple the supplemental grid-synchronized power generator to a distribution unit configured to distribute electrical power to one or more loads. The power control circuitry also includes time delay circuitry configured to control the first power switch to disconnect the supplemental grid-synchronized power generator from the main grid power source responsive to the main grid power source ceasing to provide main electrical power. The time delay circuitry is also configured to control the second power switch to operably couple the supplemental grid-synchronized power source to a distribution unit configured to distribute electrical power to at least one of loads and an energy storage system a delayed period of time following the main grid power source ceasing to provide the main electrical power. The time delay circuitry is further configured to control the first power switch to operably couple the supplemental grid-synchronized power source to the main grid power source another delayed period of time following the main grid power source beginning to provide the main electrical power.

Figure 2:
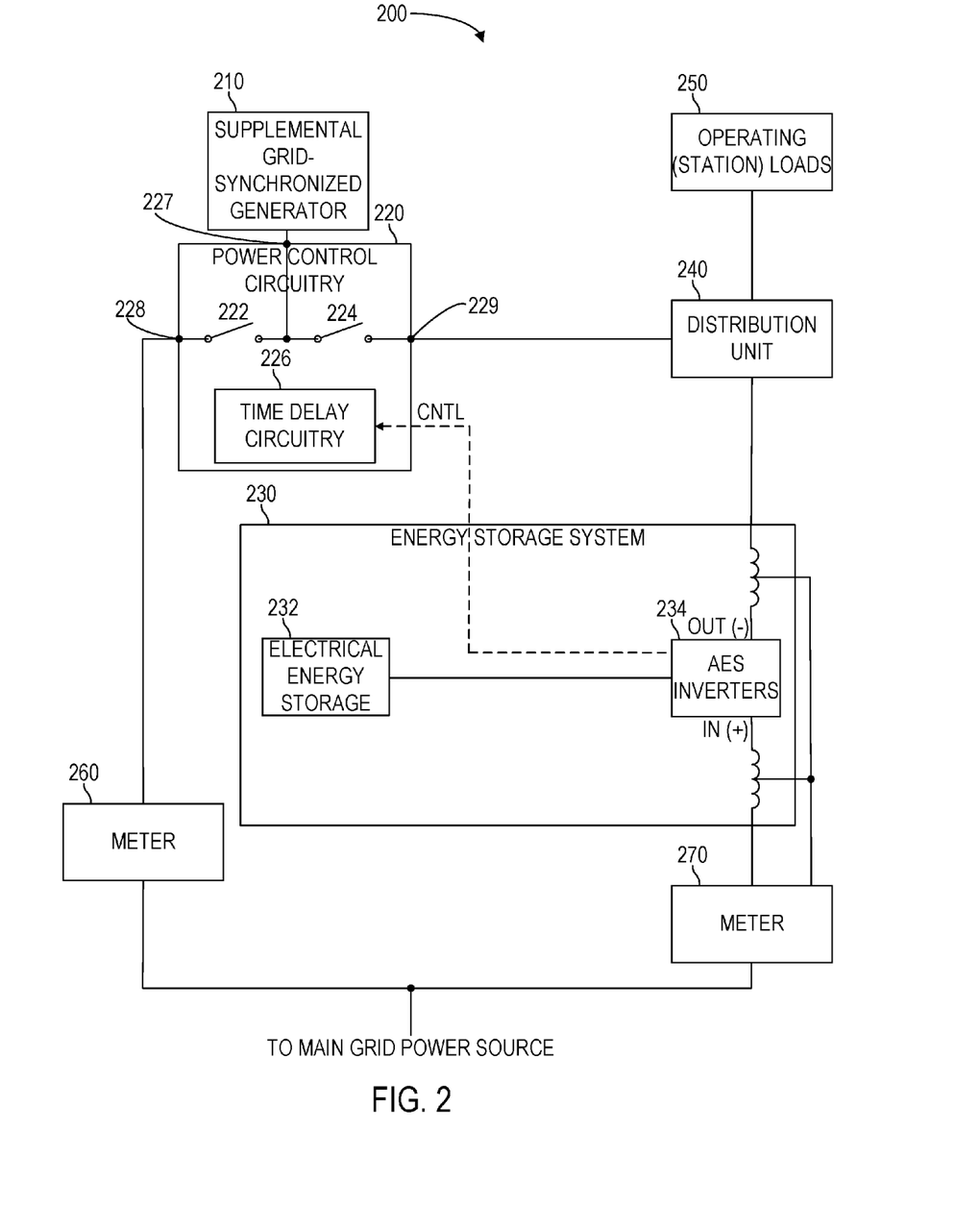
FIG. 2 is a simplified schematic diagram of an example system, according to some embodiments.

FIG. 2 is a simplified schematic diagram of an example system 200, according to some embodiments. The system 200 may, in some embodiments, be installed in a multi-unit residential building. The system 200 includes a supplemental grid-synchronized power generator 210 configured to provide supplemental electrical power. The system 200 includes power control circuitry 220 including a first power switch 222 (e.g., a relay, a network of relays, etc.) and a second power switch 224 (e.g., a relay, a network of relays, etc.). The first power switch 222 is configured to selectively operably couple a supplemental grid-synchronized power generator 210 to a main grid power source. The second power switch 224 is configured to selectively operably couple the supplemental grid-synchronized power generator 210 to a distribution unit 240 configured to distribute electrical power to one or more loads 250. The power control circuitry 220 also includes time delay circuitry 226 configured to control the first power switch 222 and the second power switch 224 to enable supplemental electrical power from the supplemental grid-synchronized power generator 210 to be distributed by the distribution unit 240 to the one or more loads 250 during a power outage of the main grid power source.

The time delay circuitry 226 is configured to control the first switch 222 and the second switch 224 to allow only one of the first switch 222 and the second switch 224 to be closed at a time, or both be open at the same time. For example, the first switch 222 may be closed and the second switch 224 may be open at a given time. Also, the first switch 222 may be open and the second switch 224 may be closed at a given time. Furthermore, the first switch 222 and the second switch 224 may both be open at a given time. The time delay circuitry 226 prevents both the first switch 222 and the second switch 224 from being closed at the same time. The time delay circuitry 226 may cause a delay in closing one of the first switch 222 and the second switch 224 after opening the other of the first switch 222 and the second switch 224. For example, if the first switch 222 is opened, closing of the second switch 224 is delayed for at least a delay period (e.g., about two seconds) by the time delay circuitry 226.

By way of non-limiting example, the time delay circuitry 226 is configured to control the first power switch 222 to disconnect the supplemental grid-synchronized power generator 210 from the main grid power source responsive to the main grid power source ceasing to provide main electrical power (e.g., a power outage). Also by way of non-limiting example, the time delay circuitry 226 is configured to control the second power switch 224 to operably couple the supplemental grid-synchronized power generator 210 to the distribution unit 240 a delayed period of time (e.g., about two seconds) following the main grid power source ceasing to provide the main electrical power. As a further non-limiting example, the time delay circuitry 226 is also configured to control the first power switch 222 to operably couple the supplemental grid-synchronized power generator to the main grid power source another delayed period of time (e.g., about two seconds) following the main grid power source beginning to provide the main electrical power (e.g., following a power outage).

The power control circuitry 220 includes a main interface 228 configured to receive the main electrical power from the main grid power source. The power control circuitry 220 also includes a supplemental interface 227 configured to receive the supplemental electrical power from the supplemental grid-synchronized generator 210. The power control circuitry 220 also includes a distribution interface 229 configured to deliver electrical power (e.g., from the main grid power source or the supplemental grid-synchronized power generator 210) to the distribution unit 240. The first power switch 222 is configured to selectively operably couple the supplemental interface 227 to the main interface 228. The second power switch 224 is configured to selectively operably couple the supplemental interface 227 to the distribution interface 229. Some detailed examples of some embodiments of the power control circuitry 220 are discussed below with reference to FIGS. 4-6.

In some embodiments, the supplemental grid-synchronized power generator 210 includes a solar photovoltaic (PV) array including one or more solar panels and one or more inverters (e.g., microinverters). In some embodiments, the PV array includes a plurality of solar panels and a microinverter for each one of the plurality of solar panels. In some embodiments, the supplemental grid-synchronized power generator 210 includes a power generator driven by wind, water, geothermal energy, etc. In some embodiments, the supplemental grid-synchronized power generator 210 includes a petroleum fuel-based power generator. In some embodiments, the supplemental grid-synchronized power generator 210 includes some other power generator, or combinations of above-mentioned power generators.

In some embodiments, the system 200 includes an energy storage system 230 operably coupled to the distribution unit 240. The energy storage system 230 includes an energy storage inverter 234 (e.g., an advanced energy storage (AES) inverter) operably coupled to an electrical energy storage device 232 (e.g., one or more battery banks). The energy storage device 232 may be charged by main electrical power from the main grid power source, supplemental power from the supplemental grid-synchronized power generator 210, or a combination thereof. The energy storage device 232 may provide backup power (e.g., distributed to the loads 250 by the distribution unit 240) during power outages of the main power. The distribution unit 240 may be configured to enable the output of the supplemental grid-synchronized power generator 210 to be parallel attached (e.g., AC coupled) to the output of an inverter, a battery-based grid inverter 234, or other AC reference capable of providing a reliable voltage and frequency reference.

In some embodiments, the energy storage inverter 234 is configured to generate a control signal CNTL configured to control the time delay circuitry 226. In some embodiments, however, the control signal CNTL may instead be provided by some other control device (e.g., a computer).

The system 200 also includes energy meters 260, 270 (e.g., a net energy meter (virtual net metering)).

In some embodiments, an advantage of the present disclosure is to enable use of pre-existing standardized metering and a plurality of current solar panels and inverters including micro inverters. In some embodiments, an advantage of the present disclosure is to enable AC power and energy output from solar panels to be delivered to a destination meter or load source when the main grid power source is active, and then still be usable when the main grid power source is inactive. In some embodiments, an advantage of the present disclosure is to prevent accidental simultaneous coupling of the main grid power source and the supplemental grid-synchronized power generator 210 to the distribution unit 240 through the power control circuitry 220. In some embodiments, an advantage of the present disclosure is that the system 200 de-energizes a UL1741/ IEEE1547.1 grid interactive inverter from one reference source before allowing connection to a second AC reference source, thereby preventing any risk of spark or damage from offsets in phase angle when the UL1741/IEEE 1547.1 grid interactive inverter is switched. In some embodiments, an advantage of the present disclosure is to allow simple configuration and installation. In some embodiments, an advantage of the present disclosure is to enable safe de-energizing, waiting, and re-energizing of the supplemental grid-synchronized generator (e.g., AC solar output from the combination of a solar panel/array and an AC Inverter).

Figure 3:
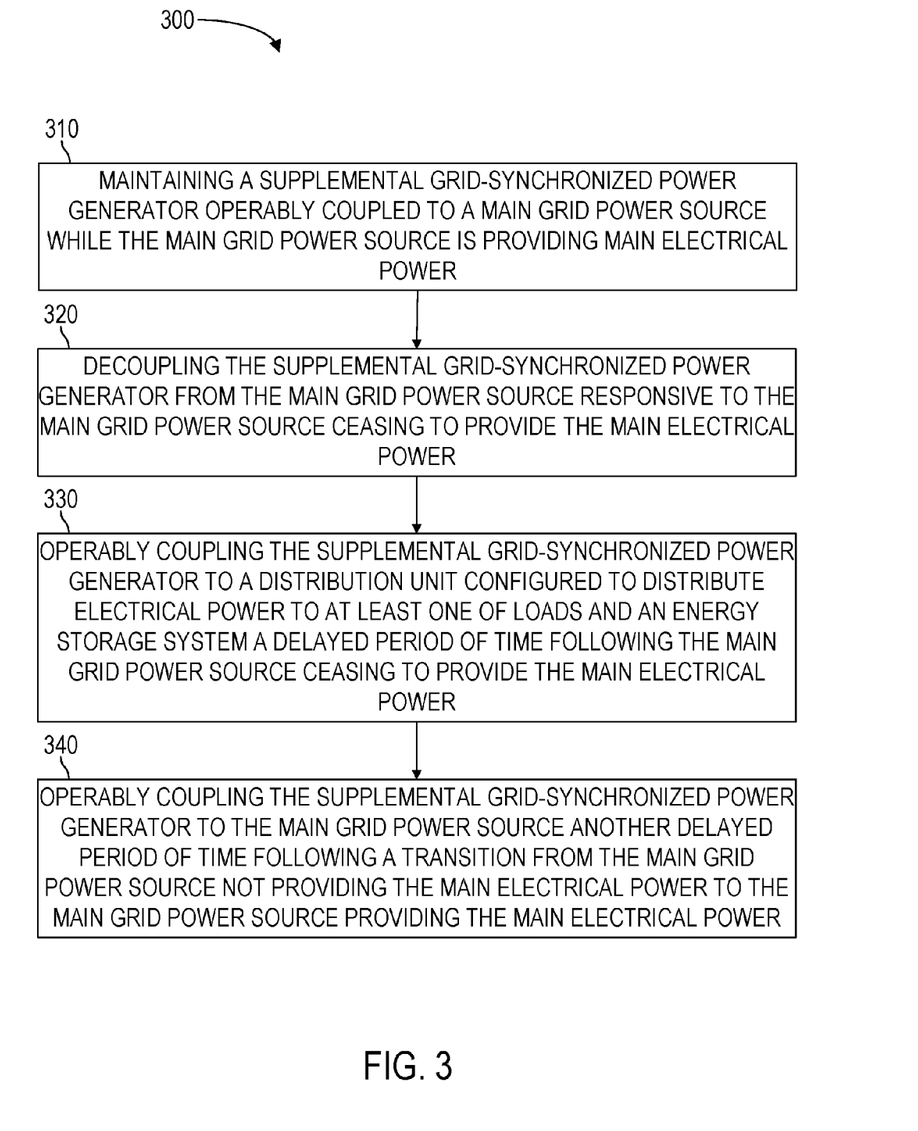
FIG. 3 is a simplified flowchart illustrating a method of operating a power system, according to some embodiments.

FIG. 3 is a simplified flowchart illustrating a method 300 of operating a power system (e.g., the system 200 of FIG. 2). Referring to FIGS. 2 and 3 together, the method 300 includes maintaining 310 the supplemental grid-synchronized power generator 210 operably coupled to the main grid power source while the main grid power source is providing main electrical power. The method 300 also includes decoupling 320 the supplemental grid-synchronized power generator 210 from the main grid power source responsive to the main grid power source ceasing to provide the main electrical power. The method 300 further includes operably coupling 330 the supplemental grid-synchronized power generator 210 to the distribution unit 240 a delayed period of time following the main grid power source ceasing to provide the main electrical power. The method 300 also includes operably coupling 340 the supplemental grid-synchronized power generator 210 to the main grid power source another delayed period of time following a transition from the main grid power source not providing the main electrical power to the main grid power source providing the main electrical power.

Figure 4:
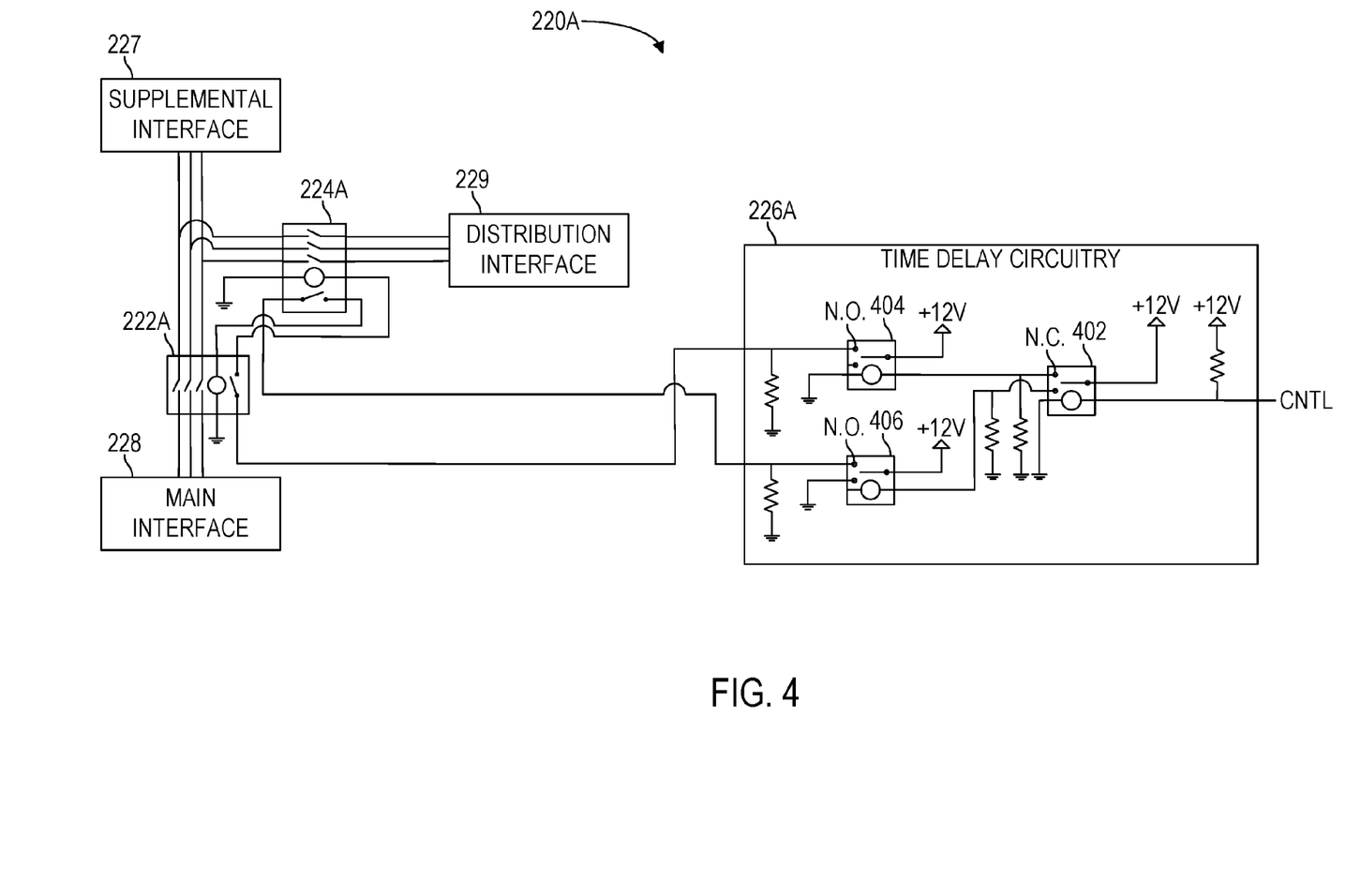
FIG. 4 is a simplified schematic diagram of example power control circuitry that may be used in the system of FIG. 2, according to some embodiments.

FIG. 4 is a simplified schematic diagram of example power control circuitry 220A that may be used in the system 200 of FIG. 2, according to some embodiments. Referring to FIGS. 2 and 4 together, the power control circuitry 220A includes the supplemental interface 227, the main interface 228, the distribution interface 229, a first power switch 222A, a second power switch 224A, and time delay circuitry 226A. As discussed above with reference to FIG. 2, the supplemental interface 227 is configured to operably couple the power control circuitry 220A to the supplemental grid-synchronized power generator 210, the main interface 228 is configured to operably couple the power control circuitry 220A to the main grid power source, and the distribution interface 229 is configured to operably couple the power control circuitry 220A to the distribution unit 240.

The first power switch 222A and the second power switch 224A each include a relay. Relay coils and normally closed external switches attached to DP contactors of the first power switch 222A and the second power switch 224A are interfaced with each other and with the time delay circuitry 226A such that normally closed external switches are only closed if the DP contactor is physically activated. Accordingly, the first power switch 222A and the second power switch 224A are configured to prevent concurrent closure.

The first power switch 222A and the second power switch 224A include multi-pole contactors mechanically linked to cover all hot and neutral lines (e.g., hot and neutral lines can be disconnected/isolated) from the supplemental interface 227 (and from the supplemental grid-synchronized power generator 210) and connected to the main interface 228 (which is connected to the meter 260 and a main AC load panel with an appropriate breaker). The first power switch 222A includes a multi-pole contactor (e.g., multi-pole, single throw) mechanically linked to cover all hot and neutral lines (e.g., hot and neutral lines can be disconnected/ isolated) of the output of the connected supplemental grid-synchronized power generator 210. The output of the connected supplemental grid-synchronized power generator 210 may be coupled through the first power switch 222A to an AC combiner panel of the meter 260. An appropriate breaker may also be located at the distribution unit 240, which is coupled to the distribution interface 229.

The time delay circuitry 226A includes a first control switch 404 (a first unidirectional time delay relay) set for a delay (e.g., a minimum two-second delay) with its normally open contact N.O. connected to an external mechanically linked single-pull single-throw (SPST) switch of the first power switch 222A on a grid side contactor, passing then to the control coil contact of the second power switch 224A. The time delay circuitry 226A also includes a second control switch 406 (a second unidirectional time delay relay) set for a delay (e.g., a minimum two-second delay) with its normally open contact N.O. connected to an external mechanically linked SPST switch of the second power switch 224A on the grid side contactor, passing then to the control coil contact of the first power switch 222A. The first control switch 404 is operably coupled to the first power switch 222A and configured to control the first power switch 222A. The second control switch 406 is operably coupled to the second power switch 224A and configured to control the second power switch 224A. The time delay circuitry 226A also includes an isolation switch 402 (a non-time delayed relay) used for isolation, and to allow a single control signal CNTL, potentially of a different voltage than that used by the rest of the time delay circuitry 226A, to be used to trigger the action of the first control switch 404 and the second control switch 406.

The power control circuitry 220 also includes a mechanically connected SPST of the second power switch 224A used as a safety interlock to prevent the failure of one of the first power switch 222A and the second power switch 224A from creating a condition wherein both the first power switch 222A and the second power switch 224A are in the closed position, creating a short across them.

A breaker or fuse equipped distribution/combiner panel may be included behind the net generator output meter (NGOM) or net energy meter (NEM) (e.g., meter 260) used normally for community or shared allocation of the solar generation credit.

In operation, the power control circuitry 220A is configured to: receive a control signal CNTL of either high or low voltage to the isolation switch 402; in response to receiving the CNTL signal, a high voltage is provided to the desired one of the first control switch 404 and the second control switch 406; the selected one of the first control switch 404 and the second control switch 406 starts its countdown to activate while concurrently the other one of the first control switch 404 and the second control switch 406 has been immediately deactivated, breaking the circuit at the one of the first power switch 222A and the second power switch 224A that is associated therewith; at the end of the countdown period a high-state voltage is applied at the normally open contact connected to the safety interlock SPST switch on the other of the first power switch 222A and the second power switch 224A. By interlocking these, an activation signal is prevented from being applied should the opposing one of the first power switch 222A and the second power switch 224A be broken or welded into a closed condition. This prevents a potential short circuit path between the main interface 228 and the distribution interface 229, which if the grid connection for the main grid power source were off, could cause a safety hazard; as a result of the end of the countdown period the first power switch 222A will close immediately, and there will be a delay of not less than two seconds (or other delay) with both the first power switch 222A and the second power switch 224A being open before the opposing one of the first power switch 222A and the second power switch 224A is closed; this delay may be sufficient for the supplemental grid-synchronized power generator 210, which is feeding power, to recognize a grid outage and trigger its immediate deactivation; upon completion of an OFF-DELAY-ON sequence in the selected direction, the supplemental grid-synchronized power generator 210 will detect a valid reference voltage and begin its customary resynchronization to provide energy output; to reverse this process the CNTL signal is reversed. The operations discussed above will be repeated in a similar sequence, but in the opposite direction to the current state of the first power switch 222A and the second power switch 224A; and/or if there is no power to the time delay circuitry 226A, then both directions of the first power switch 222A and the second power switch 224A remain open, preventing any current flow or generation.

A logic table illustrating the functioning of the power control circuitry 220A is as follows:

| CNTL | First Power Switch 222A | Second Power Switch 224A |
| --- | --- | --- |
| H | H | L |
| H to L | L (no delay) | H (2 sec delay) |
| L | L | H |
| L to H | H (2 sec delay) | L (no delay) |
| NA | H or open if no voltage | L or open if no voltage |

The letter "H" represents a logic level high, and the letter "L" represents a logic level low.

Figure 5:
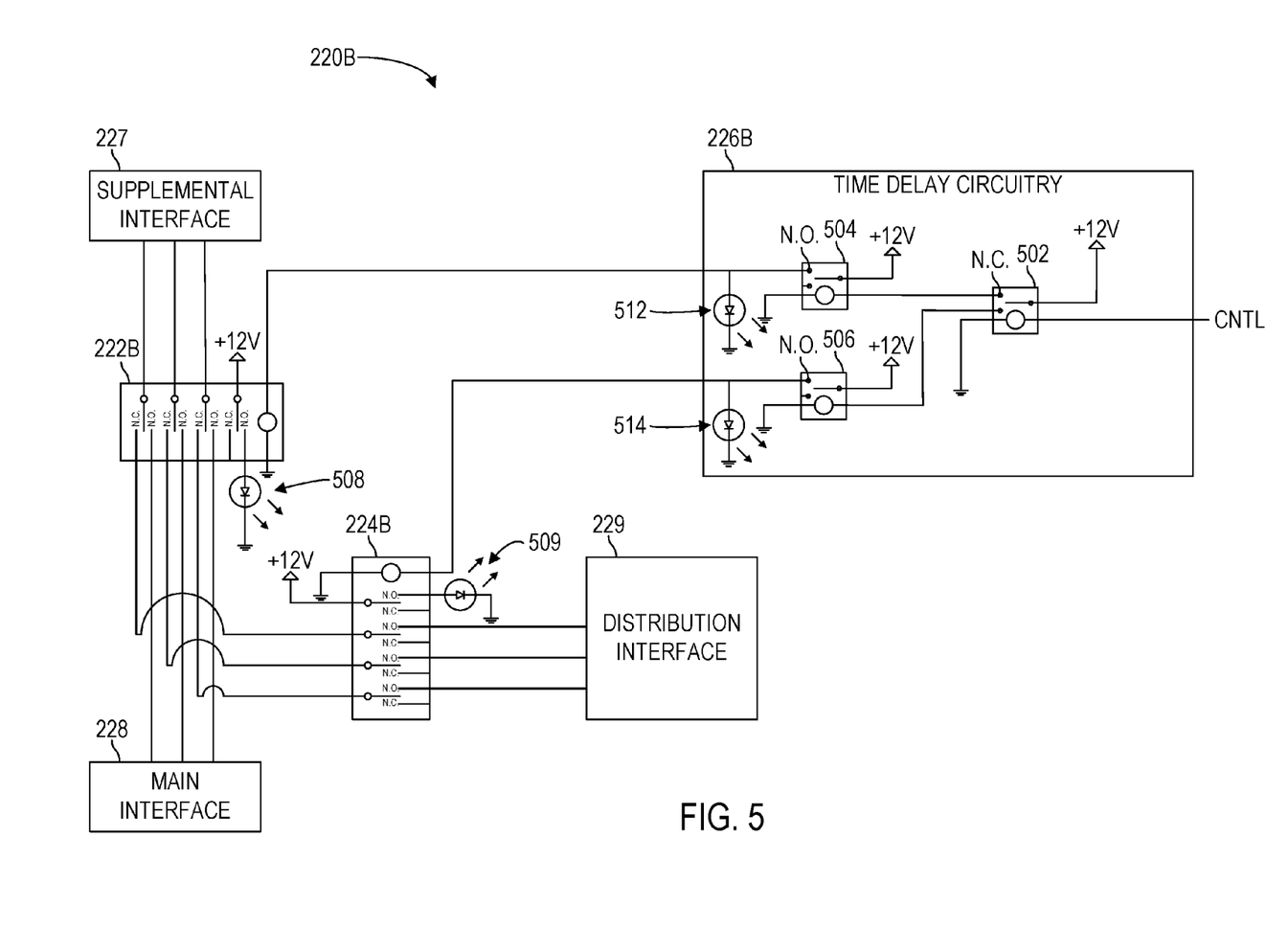
FIG. 5 is a simplified schematic diagram of example power control circuitry that may be used in the system of FIG. 2, according to some embodiments.

FIG. 5 is a simplified schematic diagram of example power control circuitry 220B that may be used in the system 200 of FIG. 2, according to some embodiments. Referring to FIGS. 2 and 5 together, a first power switch 222B and a second power switch 224B include multi-pole dual-throw contactors. The power control circuitry 220B also includes time delay circuitry 226B, which is similar to the time delay circuitry 226A discussed above with reference to FIG. 4. The time delay circuitry 226B includes an isolation switch 502, a first control switch 504 (e.g., a time delay relay) operably coupled to and configured to control the first power switch 222B, and a second control switch 506 (e.g., a time delay relay) operably coupled to and configured to control the second power switch 224B. The time delay circuitry 226B also includes a first control light emitting diode (LED) 512 configured to indicate a switching status of the first control switch 504, and a second control LED 514 configured to indicate a switching status of the second control switch 506. The first control LED 512 and the second control LED 514 may be configured to be visible to a user looking at a control panel associated with the system 200.

The power control circuitry 220B may also include a first power LED 508 configured to indicate a switching status of the first power switch 222B. The power control circuitry 220B may also include a second power LED 509 configured to indicate a switching status of the second power switch 224B. The first power LED 508 and the second power LED 509 may be configured to be visible to a user looking at a control panel associated with the system 200.

A logic table illustrating the functioning of the power control circuitry 220B is as follows:

| CNTL | First Power Switch 222B | Second Power Switch 224B |
| --- | --- | --- |
| L | H | L |
| H to L | L (no delay) | H (2 sec delay) |
| H | L | H |
| L to H | H (2 sec delay) | L (no delay) |
| NA | H or open if no voltage | L or open if no voltage |

The letter "H" represents a logic level high, and the letter "L" represents a logic level low.

Figure 6:
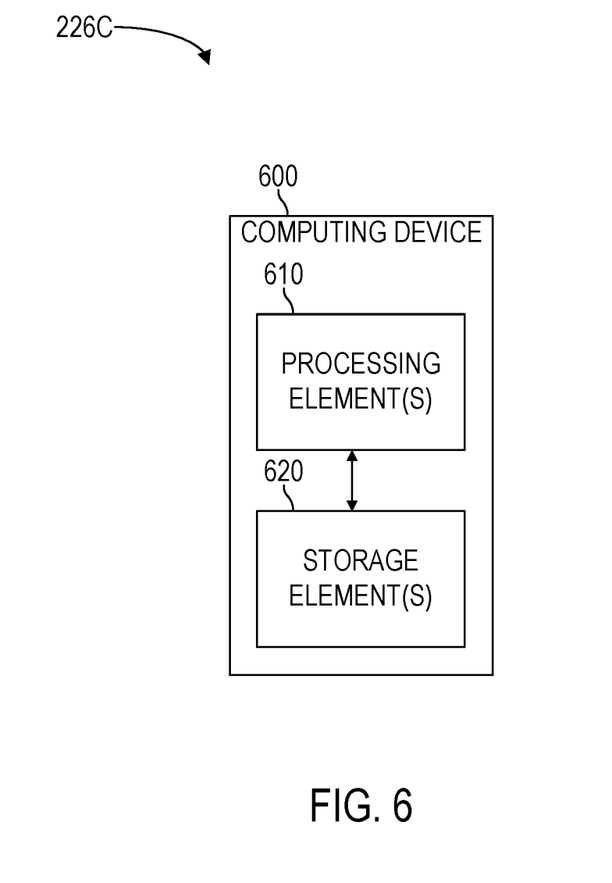
FIG. 6 is a simplified block diagram of example time delay circuitry that may be used in power control circuitry of FIG. 2, according to some embodiments.

FIG. 6 is a simplified block diagram of example time delay circuitry 226C that may be used in the power control circuitry 220 of FIG. 2. The example time delay circuitry 226C includes a computing device 600 configured to perform operations that the time delay circuitry 226 (FIG. 2) is configured to perform. The computing device 600 includes one or more processing elements (e.g., a microcontroller, a programmable logic control, a central processing unit (CPU), a field programmable gate array (FPGA), other processing circuit, or combinations thereof) operably coupled to one or more data storage elements 620 (e.g., volatile data storage (random access memory, Flash memory, etc.), non-volatile data storage (hard drive, solid state drive, removable storage, etc.)). The processing elements 610 are configured to execute computer-readable instructions stored by the storage elements 620. The computer-readable instructions are configured to instruct the processing elements 610 to perform the operations the time delay circuitry 226 is configured to perform. By way of non-limiting example, the computer-readable instructions may be configured to instruct the processing elements 610 to control the power control circuitry 220 (FIG. 2) to perform the acts 310-340 of the method 300 of FIG. 3.

Figure 7:
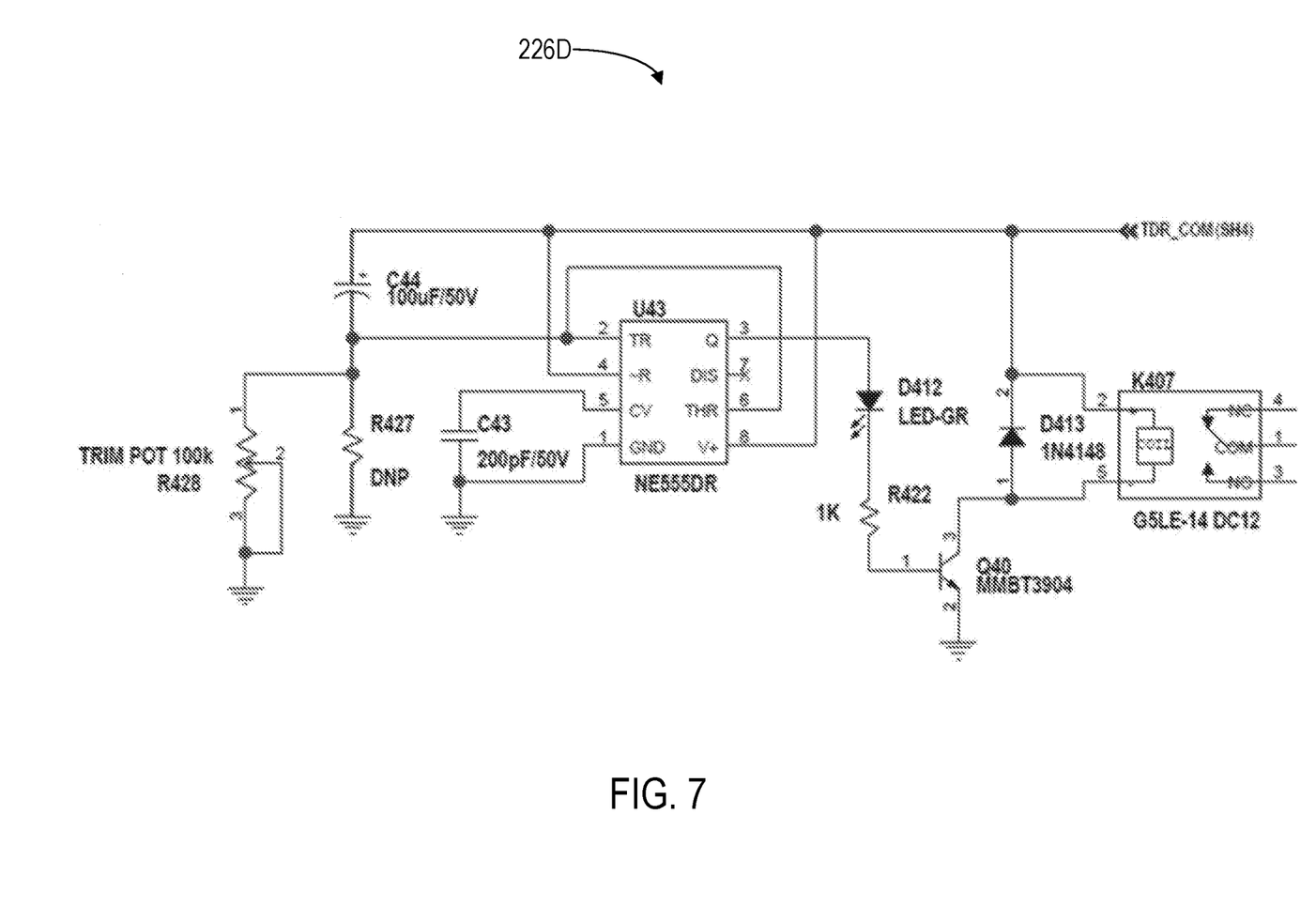
FIG. 7 is a simplified schematic diagram of example time delay circuitry that may be used in power control circuitry of FIG. 2, according to some embodiments.

FIG. 7 is a simplified schematic diagram of example time delay circuitry 226D to control the first power switch 222 and the second power switch 224 using analog components. The time delay circuitry 226D may also be implemented equivalently with a digital microcontroller, as an alternate embodiment. The time delay circuitry 226D is configured to receive a time delay relay command (TDR_COM) trigger and a delayed output control to a relay (i.e., to pin5 of K407).

While certain illustrative embodiments have been described in connection with the figures, those of ordinary skill in the art will recognize and appreciate that embodiments encompassed by the disclosure are not limited to those embodiments explicitly shown and described herein. Rather, many additions, deletions, and modifications to the embodiments described herein may be made without departing from the scope of embodiments encompassed by the disclosure, such as those hereinafter claimed, including legal equivalents. In addition, features from one disclosed embodiment may be combined with features of another disclosed embodiment while still being encompassed within the scope of embodiments encompassed by the disclosure, as contemplated by the inventors.

The invention claimed is:

1. Power control circuitry, comprising:
   a main interface configured to receive main electrical power from a main grid power source;
   a supplemental interface configured to receive supplemental electrical power from a supplemental grid-synchronized generator;
   a distribution interface configured to deliver electrical power to a distribution unit configured to distribute the electrical power to one or more loads;
   a first power switch configured to selectively operably couple the supplemental interface to the main interface;
   a second power switch configured to selectively operably couple the supplemental interface to the distribution interface; and
   time delay circuitry configured to control switching of the first power switch and the second power switch, the time delay circuitry configured to:
      control the first power switch to:
         maintain the supplemental interface operably coupled to the main interface while the main grid power source is providing the main electrical power;
         decouple the supplemental interface from the main power interface responsive to the main grid power source ceasing to provide the main electrical power; and
         operably couple the supplemental interface to the main interface a delayed period of time following a transition from the main grid power source not providing the main electrical power to the main grid power source providing the main electrical power; and
      control the second power switch to operably couple the supplemental interface to the distribution interface another delayed period of time after the main grid power ceases to provide the main electrical power.

2. The power control circuitry of claim 1, wherein the time delay circuitry is further configured to control the second power switch to disconnect the supplemental interface from the distribution interface responsive to the transition from the main grid power source not providing the main electrical power to the main grid power source providing the main electrical power.

3. The power control circuitry of claim 1, wherein the delayed period of time and the other delayed period of time each comprise at least about two seconds.

4. The power control circuitry of claim 1, wherein the time delay circuitry comprises a control input configured to receive a control command and control the first power switch and the second power switch responsive to the control command.

5. The power control circuitry of claim 1, wherein the time delay circuitry comprises:
   a first control switch operably coupled to the first power switch and configured to control the first power switch; and
   a second control switch operably coupled to the second power switch and configured to control the second power switch.

6. The power control circuitry of claim 5, wherein the time delay circuitry further comprises an isolation switch operably coupled to and configured to control the first control switch and the second control switch, wherein the isolation switch is operably coupled to a control input and configured to be controlled by a control signal received through the control input.

7. The power control circuitry of claim 5, wherein each of the first control switch and the second control switch comprises a time delay relay.

8. The power control circuitry of claim 5, wherein the time delay circuitry further comprises a first control light emitting diode (LED) and a second control LED configured to indicate a switching status of the first control switch and the second control switch, respectively.

9. The power control circuitry of claim 1, further comprising a first power light emitting diode (LED) and a second power LED configured to indicate a switching status of the first power switch and the second power switch.

10. The power control circuitry of claim 1, wherein each of the first power switch and the second power switch comprises a multi-pole single-throw switch.

11. The power control circuitry of claim 1, wherein the first power switch and the second power switch are configured such that only one of the first power switch and the second power switch can be closed at a time.

12. The power control circuitry of claim 11, wherein each of the first power switch and the second power switch is configured to disable a switching mechanism of the other of the first power switch and the second power switch while closed.

13. The power control circuitry of claim 1, wherein each of the first power switch and the second power switch comprises a multi-pole dual-throw switch.

14. A method of controlling a power system, the method comprising:
   maintaining a supplemental grid-synchronized power generator operably coupled to a main grid power source while the main grid power source is providing main electrical power;
   decoupling the supplemental grid-synchronized power generator from the main grid power source responsive to the main grid power source ceasing to provide the main electrical power;
   operably coupling the supplemental grid-synchronized power generator to a distribution unit configured to distribute electrical power to at least one of loads and an energy storage system a delayed period of time following the main grid power source ceasing to provide the main electrical power; and
   operably coupling the supplemental grid-synchronized power generator to the main grid power source another delayed period of time following a transition from the main grid power source not providing the main electrical power to the main grid power source providing the main electrical power.

15. A power system, comprising:
   power control circuitry including:
      a first power switch configured to selectively operably couple a supplemental grid-synchronized power generator to a main grid power source;
      a second power switch configured to selectively operably couple the supplemental grid-synchronized power generator to a distribution unit configured to distribute electrical power to one or more loads; and
      time delay circuitry configured to:
         control the first power switch to disconnect the supplemental grid-synchronized power generator from the main grid power source responsive to the main grid power source ceasing to provide main electrical power;
         control the second power switch to operably couple the supplemental grid-synchronized power source to a distribution unit configured to distribute electrical power to at least one of loads and an energy storage system a delayed period of time following the main grid power source ceasing to provide the main electrical power; and control the first power switch to operably couple the supplemental grid-synchronized power source to the main grid power source another delayed period of time following the main grid power source beginning to provide the main electrical power.

16. The power system of claim 15, further comprising the supplemental grid-synchronized power generator.

17. The power system of claim 16, wherein the supplemental grid-synchronized power generator comprises a solar photovoltaic (PV) array.

18. The power system of claim 15, further comprising an energy storage system operably coupled to the distribution unit.

19. The power system of claim 15, further comprising an energy storage inverter configured to generate a control signal configured to control the time delay circuitry.

20. The power system of claim 15, wherein the power system is installed in a multi-unit residential building.

\* \* \* \* \*